(12) United States Patent
Yim (10) Patent No.: US 10,354,391 B2
(45) Date of Patent: Jul. 16, 2019

(54) METHOD AND SYSTEM FOR MULTI-LABEL IMAGE SEGMENTATION

(71) Applicant: Peter Jin-Pyong Yim, Belle Mead, NJ (US)

(72) Inventor: Peter Jin-Pyong Yim, Belle Mead, NJ (US)

( * ) Notice: Subject to any disclaimer, the term of this patent is extended or adjusted under 35 U.S.C. 154(b) by 0 days.

(21) Appl. No.: 15/789,981

(22) Filed: Oct. 21, 2017

(65) Prior Publication Data

US 2018/0122081 A1    May 3, 2018

Related U.S. Application Data (60) Provisional application No. 62/413,940, filed on Oct. 27, 2016.

(51) Int. Cl.
  *G06T 7/11*    (2017.01)
  *G06T 7/162*   (2017.01)
  *G06T 7/187*   (2017.01)

(52) U.S. Cl.
  CPC ............... *G06T 7/162* (2017.01); *G06T 7/11* (2017.01); *G06T 7/187* (2017.01); *G06T 2207/20092* (2013.01)

(58) Field of Classification Search
  CPC ... G06T 7/162; G06T 7/10; G06T 7/11; G06T 7/187
  See application file for complete search history.

(56) References Cited

U.S. PATENT DOCUMENTS

| 6,744,923 | B1 * | 6/2004 | Zabih | G06K 9/20 382/154 |
|---|---|---|---|---|
| 7,003,144 | B2 * | 2/2006 | Yim | G06K 9/342 382/130 |
| 7,460,709 | B2 * | 12/2008 | Grady | G06T 7/11 382/180 |
| 7,486,820 | B2 | 2/2009 | Grady | |
| 7,519,220 | B2 * | 4/2009 | Aharon | G06K 9/342 382/173 |
| 7,542,604 | B2 * | 6/2009 | Grady | G06T 7/12 382/173 |
| 7,565,010 | B2 * | 7/2009 | Grady | G06T 7/11 382/173 |
| 7,630,548 | B2 * | 12/2009 | Grady | G06T 7/194 382/171 |
| 7,630,549 | B2 * | 12/2009 | Aharon | G06T 7/194 382/173 |
| 7,697,756 | B2 * | 4/2010 | Aharon | G06T 7/143 382/173 |

(Continued)

OTHER PUBLICATIONS

Leo Grady, Gareth Funka-Lea, "Multi-label Image Segmentation for Medical Applications Based on Graph Theoretic Electrical Potentials," Lecture Notes in Computer Science, (Computer Vision and Mathematical Methods in Medical and Biomedical Image Analysis 2004), May 15, 2004, pp. 230-245, vol. 3117, Springer International Publishing, AG.

(Continued)

*Primary Examiner* — John Villecco (57) ABSTRACT

The invention is a computer-method that pertains to the segmentation of images. The invention extends the Sim Cut model for image segmentation that allows for the segmentation of images into two parts to allow for the segmentation of images into an indefinite number of parts.

15 Claims, 7 Drawing Sheets

(56) References Cited

U.S. PATENT DOCUMENTS

| | | | |
|---|---|---|---|
| 7,711,168 B2* | 5/2010 | Grady | G06T 7/181 378/21 |
| 7,724,256 B2* | 5/2010 | Grady | G06K 9/342 345/440 |
| 7,773,807 B2* | 8/2010 | Grady | G06K 9/469 382/173 |
| 7,822,274 B2* | 10/2010 | Sinop | G06K 9/342 362/131 |
| 7,835,577 B2* | 11/2010 | Grady | G06T 7/11 382/173 |
| 8,478,044 B2* | 7/2013 | Grady | G06T 7/162 382/128 |
| 8,705,860 B2* | 4/2014 | Kohli | G06K 9/00624 382/164 |
| 8,913,830 B2* | 12/2014 | Sun | G06K 9/342 382/173 |
| 8,929,636 B2* | 1/2015 | Yim | G06T 7/136 382/131 |
| 9,025,876 B2* | 5/2015 | Schlosser | G06K 9/6267 382/180 |
| 9,214,029 B2* | 12/2015 | Yim | G06T 7/136 |
| 9,483,715 B2* | 11/2016 | Kitamura | G06K 9/6267 |
| 2003/0031351 A1* | 2/2003 | Yim | G06K 9/342 382/130 |
| 2005/0134587 A1* | 6/2005 | Geiger | G06K 9/342 345/423 |
| 2005/0163375 A1* | 7/2005 | Grady | G06T 7/11 382/180 |
| 2005/0226506 A1* | 10/2005 | Aharon | G06T 7/11 382/180 |
| 2006/0050959 A1* | 3/2006 | Grady | G06T 7/12 382/173 |
| 2006/0062457 A1* | 3/2006 | Grady | G06T 7/11 382/173 |
| 2006/0104510 A1* | 5/2006 | Aharon | G06K 9/342 382/173 |
| 2006/0104513 A1* | 5/2006 | Aharon | G06T 7/11 382/180 |
| 2006/0147115 A1* | 7/2006 | Grady | G06T 7/11 382/173 |
| 2006/0159342 A1* | 7/2006 | Sun | G06K 9/342 382/173 |
| 2006/0159343 A1* | 7/2006 | Grady | G06T 7/11 382/180 |
| 2006/0214932 A1* | 9/2006 | Grady | G06K 9/342 345/440 |
| 2006/0291721 A1* | 12/2006 | Torr | G06K 9/342 382/173 |
| 2007/0165949 A1* | 7/2007 | Sinop | G06K 9/342 382/173 |
| 2008/0056577 A1* | 3/2008 | Grady | G06K 9/469 382/180 |
| 2010/0104186 A1* | 4/2010 | Grady | G06K 9/469 382/173 |
| 2011/0013837 A1* | 1/2011 | Bergman | G06T 7/11 382/173 |
| 2012/0314949 A1* | 12/2012 | Grady | G06T 7/11 382/173 |
| 2013/0216116 A1* | 8/2013 | Yim | G06T 7/136 382/131 |
| 2013/0230247 A1* | 9/2013 | Schlosser | G06K 9/6267 382/180 |
| 2015/0002538 A1* | 1/2015 | Sohn | A61B 8/5223 345/629 |
| 2015/0110377 A1* | 4/2015 | Yim | G06T 7/136 382/131 |
| 2015/0199593 A1* | 7/2015 | Kitamura | G06K 9/6267 382/180 |
| 2015/0250455 A1* | 9/2015 | Lee | G06K 9/6255 382/131 |
| 2016/0300124 A1* | 10/2016 | Yim | G06K 9/6224 |
| 2016/0328855 A1* | 11/2016 | Lay | G06T 5/005 |
| 2016/0364626 A1* | 12/2016 | Sasaki | G06K 9/4671 |
| 2017/0039683 A1* | 2/2017 | Yamamoto | G06F 3/04842 |
| 2018/0247413 A1* | 8/2018 | Novikov | G06T 7/0012 |
| 2018/0336683 A1* | 11/2018 | Feng | G06T 7/13 |

OTHER PUBLICATIONS

Yuri Boykov, Olga Veksler, Ramin Zabih, "Fast Approximate Energy Minimization via Graph Cuts," IEEE Transactions on Pattern Analysis and Machine Intelligence, Nov. 2001, pp. 1222-1239, vol. 23, No. 11, IEEE.

* cited by examiner

METHOD AND SYSTEM FOR MULTI-LABEL IMAGE SEGMENTATION

CROSS REFERENCE TO RELATED APPLICATIONS

This application claims benefit of U.S. Provisional Patent Application No. 62/413,940, filed Oct. 27, 2016, and incorporated herein by reference in its entirety.

FIELD OF THE INVENTION

The disclosure relates to segmenting digital images, and more particularly to segmenting digital images in the case of more than two labels.

BACKGROUND OF THE INVENTION

A method and system has been invented that allow for image segmentation in the case of more than two labels using a novel graph cut model.

The method is based on graphs that have the form of undirected flow networks. The flow network is an undirected weighted graph, G is defined as a set of nodes or vertices V, a set of edges E and a positive weight function, w associated with the edges:

$$G=(V,E) \text{ and } w:E \to R_+ \quad (1)$$

where each edge, {p, q} is defined as a pair of nodes p, q∈V. Additionally, a subset of the nodes, L are "label" nodes.

A graph cut, C is defined as a subset of the edges in the graph such that when those edges are removed from the graph the remaining graph consists of |L| connected components and each connected component contains one node from the set L A minimum-weight graph cut or minimum cut is a graph cut that has a minimum weight of all the possible graph cuts:

$$C_{min} = \operatorname*{argmin}_{C \in \chi} \sum_{\{p,q\} \in C} w_{pq} \quad (2)$$

where $\chi$ is the set of all possible graph cuts.

An exact solution for the graph cut can be obtained for the case with binary labels. Methods for obtaining this solution are based on establishing a flow through the graph. All flows are allowed that conserve flow at each node and, for each edge in the graph, are less than the weight of the edge. Another approach is to establish flow through electrical network models. In these methods, an electrical network is defined using resistors that represent the weights at each edge in the graph. A competitive algorithm for obtaining the graph cut has arisen based on the electrical model. A novel methodology is presented here that generalizes prior methods to allow for image segmentation in the case of more than two labels.

SUMMARY OF THE INVENTION

A computer-implemented method for image segmentation is disclosed, the method comprising acquiring a digital image; defining a set of image vertices from the digital image; defining a set of label vertices; constructing a graph from said image vertices and label vertices wherein said graph; calculating a non-negative cost function; constructing an electrical network based upon the constructed graph; simulating the electrical network one time for each label; and segmenting the digital image based upon the voltages obtained from the simulations of the electrical network.

BRIEF DESCRIPTION OF THE DRAWINGS

One or more embodiments will now be described, by way of example, with reference to the accompanying drawings, in which.

DETAILED DESCRIPTION OF THE PREFERRED EMBODIMENTS

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 1:
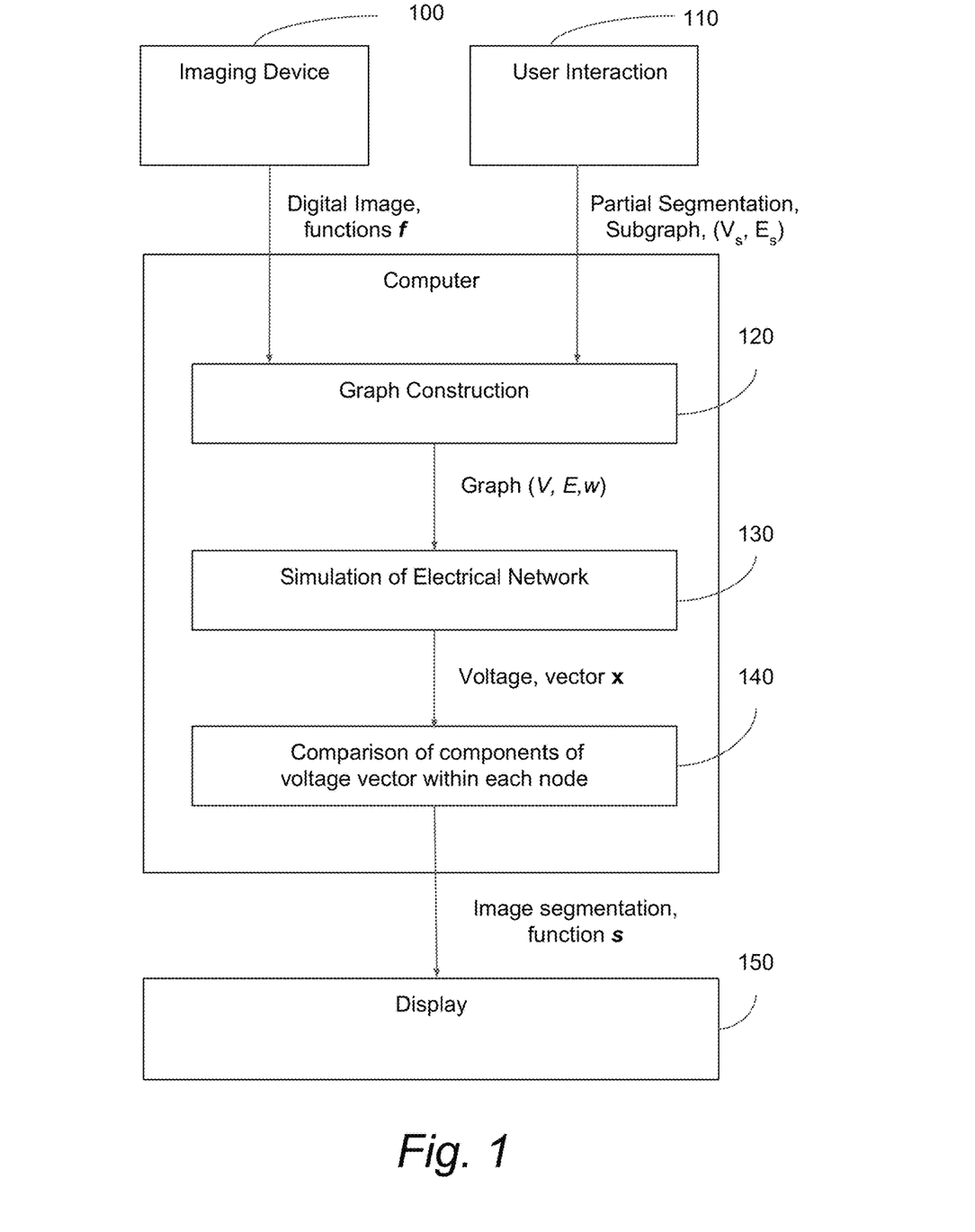
FIG. 1 schematically shows a flowchart of appearance-based image segmentation, in accordance with an embodiment the present disclosure.

Referring now to the drawings, wherein the depictions are for the purpose of illustrating certain exemplary embodiments only and not for the purpose of limiting the same, FIG. 1 schematically shows a flowchart of a segmentation algorithm according to an exemplary embodiment. The algorithm begins at step 105 by acquiring an n-dimensional digital image from an imaging scanner. For the purposes of this application, an image is any scalar or vector function on n-dimensional coordinates. The image may have two or a higher number of dimensions. The digital image may be provided by any one of a number of known imaging devices including medical-based imaging device such as a magnetic resonance image, a computed tomography image, an optical coherence tomography image, or an ultrasound-originating image. It is to be appreciated that imaging, for use in embodiments of the present disclosure, can be achieved utilizing traditional scanners or any other image acquisition technique as would be appreciated by those having ordinary skill in the art.

Figure 7:
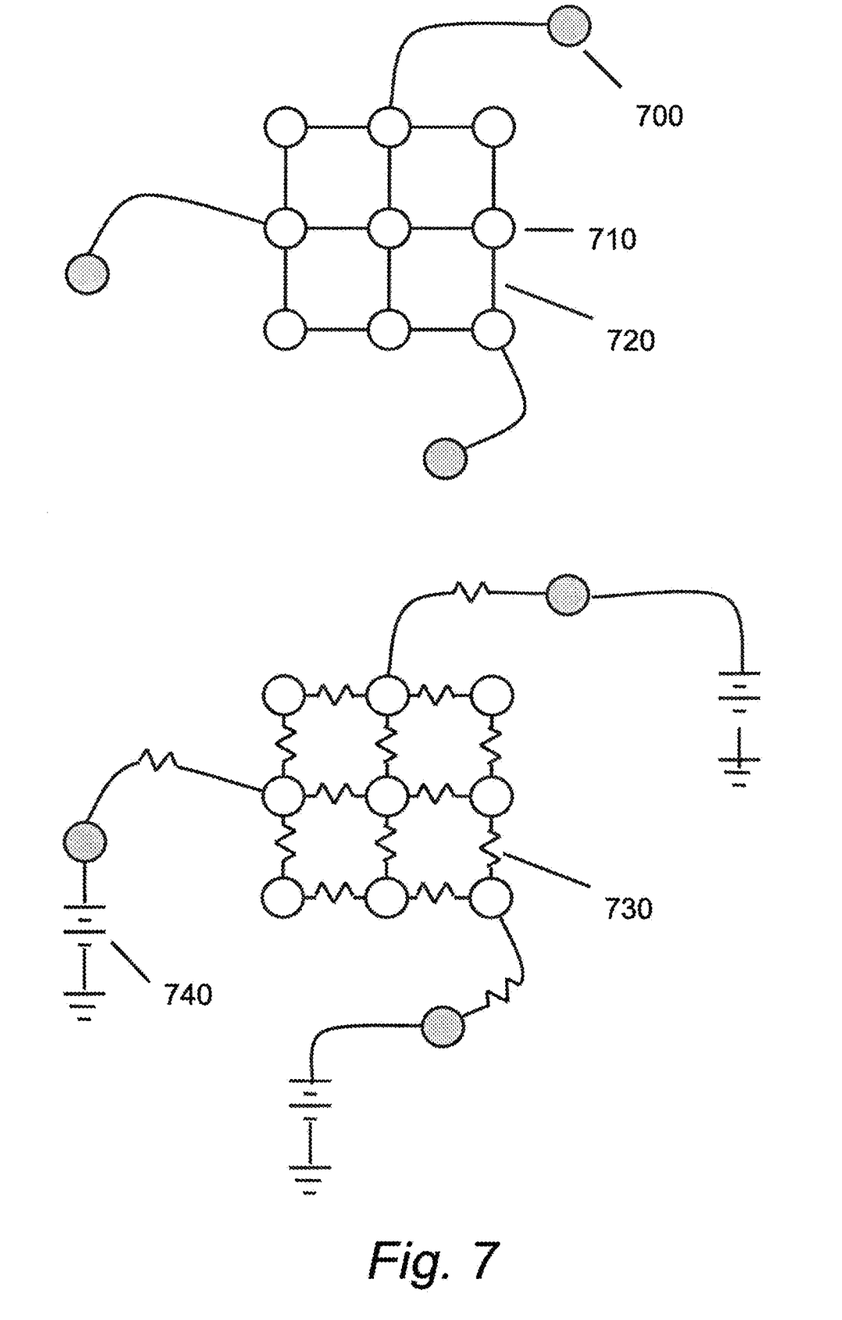
FIG. 7 schematically shows an example of a graph and the corresponding vector electrical network that is simulated in order to perform image segmentation, in accordance with an embodiment the present disclosure.

A graph is constructed at step 100 from the image or, in one embodiment, a series of images. Each pixel i.e., point, of said image is associated with a vertex of said graph and said graph includes an edge connecting each pair of vertices corresponding to adjacent points in said image. The graph may be defined as G=(V, E, w) with V representing a set of vertices of a graph, and E representing a set of edges of a graph 720 such that every pixel u or v has a corresponding vertex 710, and w is a set of non-negative values for the weight of each edge in the graph. A set L is defined representing labels 700. Image segmentation will consist of the assignment of one of these labels to each point in the image.

In one embodiment, optional limited segmentation may be performed by a user-operator 110. The optional limited segmentation, or initial segmentation, may be outputted to the graph construction 120. In one embodiment, optional limited segmentation may be performed by assigning seeds, either interactively or automatically by acquiring landmarks that belong to each partition of the image.

An electrical network will be constructed based on the graph 130. The electrical network is a network of resistors with each resistor 730 representing one of the edges in the graph with the same connectivity as the corresponding edges in the graph. The electrical behavior of the resistors is non-linear and is given by the relation:

$$i_{pq} = \frac{w_{pq}}{1 + \|x_p - x_q\|}(x_p - x_q) \quad (3)$$

where i and x are vectors with |L| components. The vector i is analogous to electrical current and the vector x is analogous to electrical voltage.

Each of the components of the current and voltage vectors are associated with a label in the graph. The relationship between labels and the voltage and current vectors is given by a map θ:

$$\theta : L \to \{u_1, u_2, \ldots u_{|L|}\} \quad (4)$$

where $u_1, u_2 \ldots$ are vectors $R^{|V|}$. For each label, the vector is 1 for the component whose index is that of the node in the graph that is the label. All other components of the vectors are zero.

Input to the electrical network is applied at the nodes in the electrical network corresponding to the nodes in the graph in the set L. A vector-valued voltage 740 is applied to each of the input nodes with the vector direction given by θ:

$$x_l = v_{in}\theta(l) \quad (5)$$

where $v_{in}$ is a large number and $l \in L$

Constraints are used to obtain a system of equations for the voltage. At each node, $p \in V \setminus L$ the net electrical current is constrained to be zero.

$$\sum_{q \in N_p} i_{pq} = 0 \quad (6)$$

where $N_p$ is the set of nodes in the electrical network that are directly connected to the node p The systems of equations from (5) and (6) can be written in matrix form:

$$A(X)X = B \quad (7)$$

where A(X)X represents a factorization of the non-constant terms in the system of equations. X is a |V|×|L| matrix. Each row of X represents the unknown voltage vector at one of the nodes in electrical network, $x_p$. A(X) is a |V|×|V| matrix and B is a |V|×|L| matrix and represents the constant terms in the system of equations.

The system of equations is solved using the fixed point method:

$$A(\tilde{X}_k)\tilde{X}_{k+1} = B \quad (8)$$

where $\tilde{X}$ is an approximate solution and k is the iteration. The fixed point solution is initialized with the zero matrix $\tilde{X}_0 = 0$ Partition of the graph and the image 140 is represented by a map, S, from the set of nodes, V, to the indices of the labels, L. The partition is obtained by selecting the label at each node that corresponds to largest component of the voltage at that node.

$$S = \{(j, s_j) | s_j = \operatorname{argmax}(\tilde{x}_i^j), j \in V\} \quad (9)$$

where $s_j$ is the index of the label assigned to the $j^{th}$ node of the graph. $\tilde{x}_i^j$ is the voltage vector at the $j^{th}$ node after the $i^{th}$ iteration.

Figure 2:
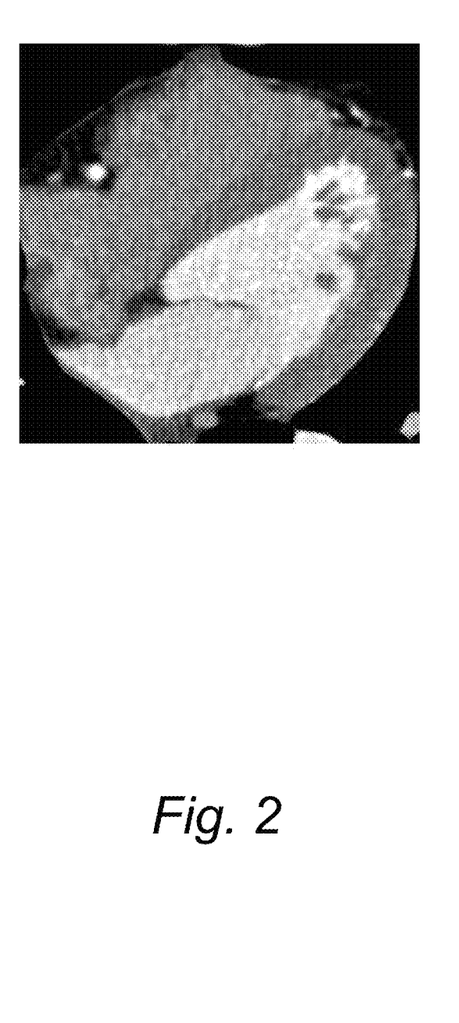
FIG. 2 is an exemplary medical image before applying appearance-based image segmentation disclosed herein, in accordance with an embodiment the present disclosure.

In one embodiment, the invention is applied to the segmentation of an image of the heart using computed tomography. The computed tomography is shown in FIG. 2. A graph was constructed from the image:

$$G_{CT} = (V_{CT}, E_{CT}) \text{ and } w_{CT} : E \to R_+ \quad (10)$$

where $V_{CT} = P_{CT} \cup L_{CT}$ where $P_{CT}$ is the set of pixels in the image and $L_{CT}$ is a set of 10 labels. Each node in the image has a value, $f$ assigned to it. For pixel nodes, the value of $f$ is the image intensity of the corresponding pixel. For label nodes, the value of $f$ is the class intensity of the label. The class intensity is a value in the set $\{-100, -50, 0, \ldots 350\}$. For each edge, $e_{pq}$, the difference in the intensity function $f$ is given by a function $\delta_{pq}$:

$$\delta_{pq} = |f(p) - f(q)| \quad (11)$$

The set of edges in the graph includes edges that produce a regularization effect, $E_{CT}^N$ and edges that relate the pixel nodes to the labels $E_{CT}^L$:

$$E_{CT} = E_{CT}^N \cup E_{CT}^L \quad (12)$$

$E_{CT}^N$ includes edges between all pairs of adjacent pixels in the image while $E_{CT}^L$ includes edges between all pixel nodes in the image and all label nodes.

The weight of the edges is given by the function:

$$w_{CT}(e_{pq}) = \begin{cases} \dfrac{2.0}{1.0 + \delta_{pq}^2}, & \text{if } e_{pq} \in E_{CT}^N \\ \dfrac{1.0}{1.0 + \delta_{pq}^2}, & \text{if } e_{pq} \in E_{CT}^L \end{cases} \quad (13)$$

Figure 3:
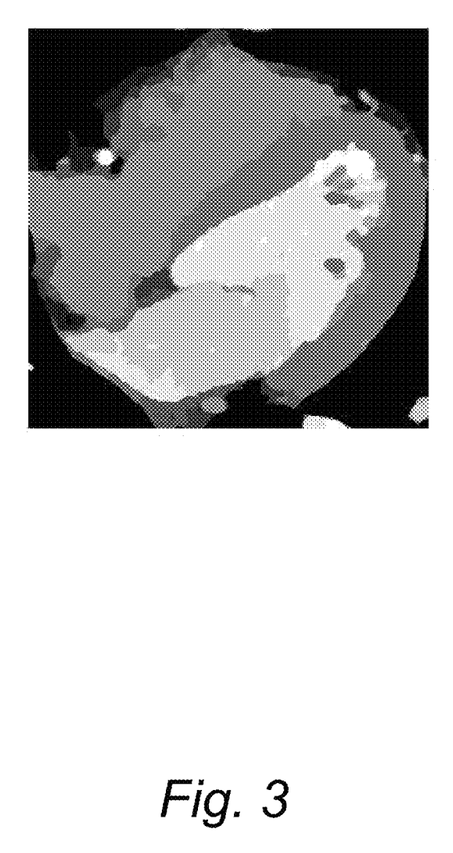
FIG. 3 is an exemplary medical image after applying appearance-based image segmentation disclosed herein, in accordance with an embodiment the present disclosure.

For construction of the graph, edges were included based on the 8-neighbor adjacency. The input voltage magnitude was $v_{in} = 10^6$. A solution was obtained for 10 fixed-point iterations. A direct solver was used at each fixed-point iteration. The algorithm was implemented in Python with the Numpy, Scipy, and Networkx modules. The segmentation result is shown in FIG. 3.

Figure 4:
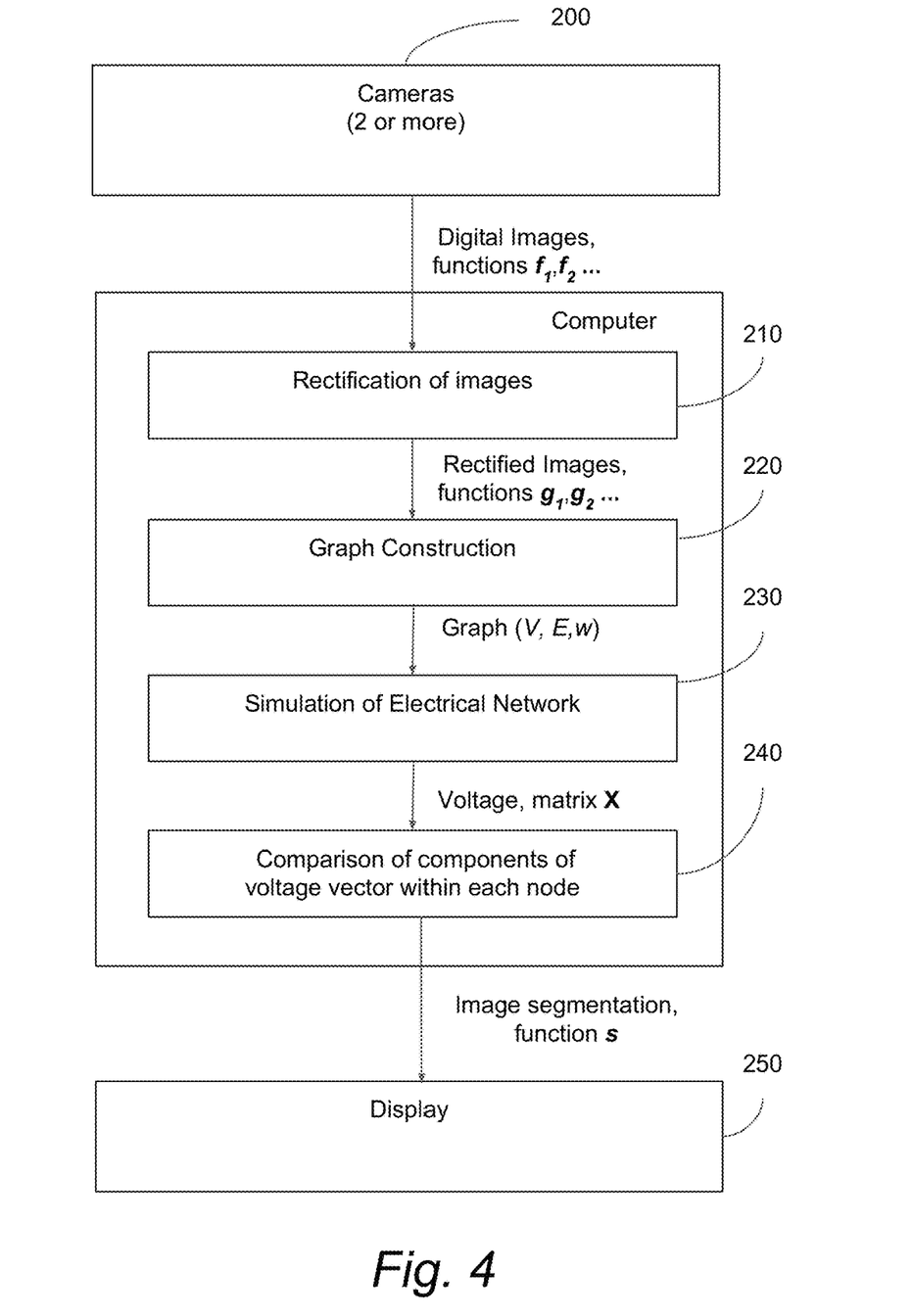
FIG. 4 schematically shows a flowchart of depth-based image segmentation, in accordance with an embodiment the present disclosure.

In another embodiment, the invention is applied to the segmentation of a photograph for the purpose of depth estimation, FIG. 4. The segmentation is performed using one additional view 200. The images are then rectified 210 and a graph 220 is constructed from the rectified images. Simulation 230 of the corresponding electrical network is performed and assignment of labels 240 is performed to obtain the segmentation.

In this embodiment, each label represents the shift in position of where an object appears in photographs taken at two different horizontal positions. That shift is geometrically related to the distance of the object from the cameras. A graph, $G_{stereo}$ is constructed from a pair of photographs:

$$G_{stereo}=(V_{stereo}, E_{stereo}) \text{ and } w_{stereo}:E_{stereo} \rightarrow R_+ \quad (14)$$

The graph, $G_{stereo}$ has the same structure as the graph used for computed tomography segmentation. The set of nodes in the graph $V_{stereo}$ are the pixels in the photograph from the left camera and the set of labels $L_{stereo}$. Edges are included between nodes of adjacent pixels and between each pixel and all of the label nodes:

$$E_{stereo}=E_{stereo}^N \cup E_{stereo}^L \quad (15)$$

Figure 5:
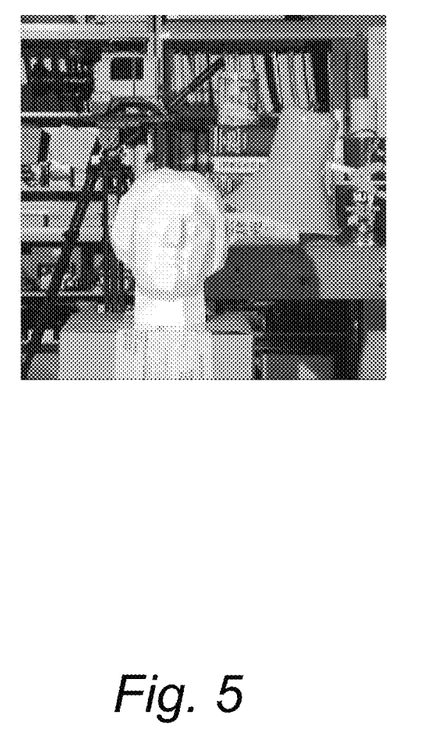
FIG. 5 is an exemplary gray-scale version of a photograph used in depth-based image segmentation before applying the image segmentation disclosed herein, in accordance with an embodiment the present disclosure.
Figure 6:
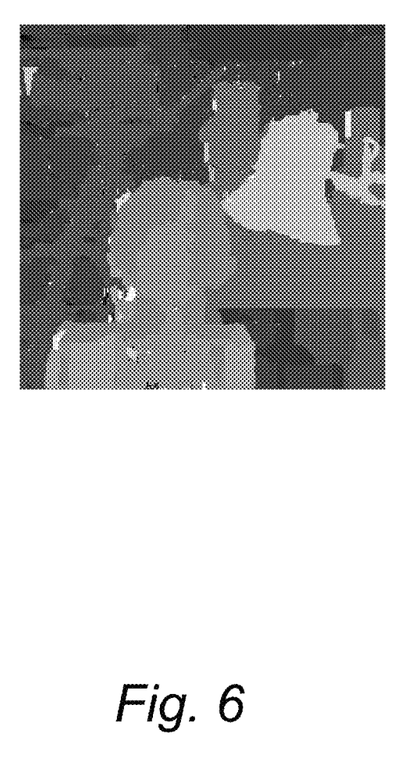
FIG. 6 is an exemplary photograph used in depth-based image segmentation after applying the image segmentation disclosed herein, in accordance with an embodiment the present disclosure.

For the edges in $E_{stereo}$, the weights are given by:

$$w_{stereo}(e_{pq}) = \begin{cases} S(f_{left}(p), f_{left}(q)), & \text{if } e_{pq} \in E_{stereo}^N \\ S(f_{left}(p), f_{right}(t(e_{pq}))), & \text{if } e_{pq} \in E_{stereo}^L \end{cases} \quad (16)$$

where the function $f_{left}$ and $f_{right}$ are vectors representing the RGB channels of the color in the left and right photographs, respectively. $t(e_{pq})$ is a map from an edge to a pixel in the right photograph. The location of the pixel in the right photograph is the position of the pixel p shifted to the left by the shift associated with the label node q.

S is defined as:

$$S(x, y) = 0.1 + \exp\left(\frac{-\|x - y\|^2}{100}\right) \quad (17)$$

It is to be understood that the following claims are intended to cover all of the generic and specific features of the invention herein described and all statements of the scope of the invention which, as a matter of language, might be said to fall therebetween.

What is claimed:

1. A computer-implemented method for image segmentation, the method comprising:
   (a) acquiring a digital image;
   (b) defining a set of image vertices from the digital image wherein each vertex is associated with a point of said image or one of a set of labels, L;
   (c) defining the set of label vertices from the set of labels wherein each vertex is associated with one of a set of labels;
   (d) constructing a graph from said image vertices and label vertices wherein said graph includes an edge connecting each vertex to all adjacent image vertices corresponding to adjacent points in said image and wherein an edge connects each label vertex to one or more image vertices and wherein all edges are undirected;
   (e) calculating a non-negative cost function, wherein each calculated cost is associated with each edge in said graph and is derived from the image intensities;
   (f) constructing an electrical network based upon the constructed graph wherein the current-voltage relationship for the devices in the electrical network are related to the weight of the corresponding edges in the graph;
   (g) simulating the electrical network one time for each label wherein for each simulation the voltage of the node corresponding to the given label is set to a input high voltage and the voltage of the nodes corresponding to the remaining labels are set to a low input voltage;
   (h) segmenting the digital image based upon the voltages obtained from the simulations of the electrical network;
   wherein the simulation of the electrical network utilizes fixed-point linearization:

$$A(\tilde{X}_k)\tilde{X}_{k+1}=B$$

where $\tilde{X}$ is an approximate solution and k is an iteration;
where a fixed point solution is initialized with a zero matrix $\tilde{X}_0=0$;
where $A(\tilde{X}_k)$ is a $|V| \times |V|$ matrix whose elements are:

$$a_{pq} = \begin{cases} 1, & \text{if } p = q, p, q \in \lambda \\ \frac{-w_{pq}}{1 + \|x_p^k - x_q^k\|}, & \text{if } p \neq q \text{ and } p \notin \lambda \\ \sum_{q \in N_p} \frac{w_{pq}}{1 + \|x_p - x_q\|} & \text{if } p = q \text{ and } p \notin \lambda \end{cases}$$

where $x_p^k$ is the voltage at a node p at iteration k in the simulation;
where $N_p$ is a set of neighbors of the node p in the graph;
where $-w_{pq}$ is the non-negative weight of the edge in the graph between nodes p and q;
where $\lambda$ is the set of nodes corresponding the set of labels, L;
where B is a $|V| \times |L|$ matrix and represents constant terms in the system of equations, where V is the set of nodes in the graph; and
where the matrix B is defined as follows:

$$B = v_{in}\Theta$$

where v is a large positive number;
where $\Theta$ is a matrix with dimensions $|V| \times |L|$ where each column corresponds to one of the labels;
where a component of each said column has a value of 1 whose index is that of the node in the graph that is the label;
where the value of all other components of each said column are zero.

2. The method of claim 1 wherein the cost function is associated with a similarity metric associated with an image intensity at the pair of vertices joined by the directed edge.

3. The method of claim 1 wherein electrical devices corresponding to edges in the graph have a current-voltage characteristic given by:

$$i_{pq} = \frac{w_{pq}}{1 + \|x_p - x_q\|}(x_p - x_q)$$

where i and x are vectors with $|L|$ components where L is the set of labels, the vector $i_{pq}$ is the electrical current between the node p and q for all input conditions, the vector $x_p$ is the electrical voltage at the node p for all input conditions and $w_{pq}$ is the non-negative weight of the edge in the graph between nodes p and q.

4. The method of claim 1 wherein $v_{in}$ is 1,000,000.

5. The method of claim 1 wherein the simulation of the electrical network is obtained using serial processing methods for solving systems of linear equations.

6. The method of claim 5 wherein the serial processing method for solving the systems of linear equations is algebraic multigrid.

7. The method of claim 1 wherein the simulation of the electrical network is obtained using parallel processing methods for solving systems of linear equations.

8. The method of claim 7 wherein the parallel processing method for solving the systems of linear equations is algebraic multigrid.

9. The method of claim 1 wherein the segmentation of the image is obtained by assigning a label of the set of labels to each said node based on a component of the voltage vector that has a maximum magnitude.

10. The method of claim 1 wherein the digital image comprises a medical image and the segmentation is obtained based on appearance.

11. The method of claim 1 wherein image segmentation is applied to a photograph and the segmentation is based on appearance.

12. The method of claim 1 wherein the image segmentation is applied to a photograph and the segmentation is based on depth.

13. The method of claim 1 wherein partial manual segmentation of the image is used to select points in the image that will be a node in the graph that are connected to each label node.

14. A non-transitory computer-readable medium on which is stored computer instructions for performing the steps of claim 1.

15. A system for image segmentation, the system comprising:
cameras or other digital imaging devices,
a computer, and
a display device;
wherein the computer is configured to perform the following operations:
(a) acquiring a digital image;
(b) defining a set of image vertices from the digital image wherein each vertex is associated with a point of said image or one of the set of labels;
(c) defining a set of label vertices from a set of labels wherein each vertex is associated with one of the set of labels;
(d) constructing a graph from said image vertices and label vertices wherein said graph includes an edge connecting each vertex to all adjacent image vertices corresponding to adjacent points in said image and wherein an edge connects each label vertex to one or more image vertices and wherein all edges are undirected;
(e) calculating a non-negative cost function, wherein each calculated cost is associated with each edge in said graph and is derived from the image intensities;
(f) constructing an electrical network based upon the constructed graph wherein the current-voltage relationship for the devices in the electrical network are related to the weight of the corresponding edges in the graph;
(g) simulating the electrical network one time for each label wherein for each simulation the voltage of the node corresponding to the given label is set to a input high voltage and the voltage of the nodes corresponding to the remaining labels are set to a low input voltage;
(h) segmenting the digital image based upon the voltages obtained from the simulations of the electrical network;
wherein the simulation of the electrical network utilizes fixed-point linearization:

$$A(\tilde{X}_k)\tilde{X}_{k+1}=B$$

where $\tilde{X}$ is an approximate solution and k is an iteration;
where a fixed point solution is initialized with a zero matrix $\tilde{X}_0=0$;
where $A(\tilde{X}_k)$ is a $|V|\times|V|$ matrix whose elements are:

$$a_{pq} = \begin{cases} 1, & \text{if } p=q, p, q \in \lambda \\ \dfrac{-w_{pq}}{1+\|x_p^k - x_q^k\|}, & \text{if } p \neq q \text{ and } p \notin \lambda \\ \displaystyle\sum_{q \in N_p} \dfrac{w_{pq}}{1+\|x_p - x_q\|} & \text{if } p=q \text{ and } p \notin \lambda \end{cases}$$

where $x_p^k$ is the voltage at a node p at iteration k in the simulation;
where $N_P$ is a set of neighbors of the node p in the graph;
where $-w_{pq}$ is the non-negative weight of the edge in the graph between nodes p and q;
where λ is the set of nodes corresponding the set of labels, L;
where B is a $|V|\times|L|$ matrix and represents constant terms in the system of equations, where V is the set of nodes in the graph; and
where the matrix B is defined as follows:

$$B=v_{in}\Theta$$

where $v_{in}$ is a large positive number;
where Θ is a matrix with dimensions $|V|\times|L|$ where each column corresponds to one of the labels;
where a component of each said column has a value of 1 whose index is that of the node in the graph that is the label;
where the value of all other components of each said column are zero.

* * * * *